United States Patent
Kutschera et al.

(10) Patent No.: US 8,841,389 B2
(45) Date of Patent: Sep. 23, 2014

(54) PROCESS FOR PRODUCING POLYMERS BY MEANS OF EMULSION OR SUSPENSION POLYMERIZATION IN A JET LOOP REACTOR

(75) Inventors: Dirk Kutschera, Burghausen (DE);
Josef Eisenlauer, Burghausen (DE);
Wolf-Dieter Hergeth, Julbach (DE);
Hans-Peter Weitzel, Reischach (DE);
Mathias Wiedemann, Hochstetten-Dhaun (DE)

(73) Assignee: WACKER Chemie AG, Munich (DE)

( * ) Notice: Subject to any disclaimer, the term of this patent is extended or adjusted under 35 U.S.C. 154(b) by 0 days.

(21) Appl. No.: 14/004,317

(22) PCT Filed: Mar. 9, 2012

(86) PCT No.: PCT/EP2012/054162
§ 371 (c)(1),
(2), (4) Date: Dec. 16, 2013

(87) PCT Pub. No.: WO2012/120136
PCT Pub. Date: Sep. 13, 2012

(65) Prior Publication Data
US 2014/0094573 A1    Apr. 3, 2014

(30) Foreign Application Priority Data
Mar. 10, 2011 (DE) .......................... 10 2011 005 388

(51) Int. Cl.
| | | |
|---|---|---|
| *C08F 2/18* | (2006.01) | |
| *C08F 2/22* | (2006.01) | |
| *B01J 19/26* | (2006.01) | |
| *C08F 2/01* | (2006.01) | |
| *B01J 8/18* | (2006.01) | |
| *C04B 24/26* | (2006.01) | |
| *B01J 8/20* | (2006.01) | |
| *B01J 8/22* | (2006.01) | |
| *B01J 8/38* | (2006.01) | |
| *C04B 28/02* | (2006.01) | |
| *C08F 120/40* | (2006.01) | |
| *C04B 111/00* | (2006.01) | |
| *C04B 103/00* | (2006.01) | |
| *C04B 111/70* | (2006.01) | |
| *C04B 111/72* | (2006.01) | |
| *C04B 111/60* | (2006.01) | |

(52) U.S. Cl.
CPC ..... *C08F 120/40* (2013.01); *C04B 2111/00672* (2013.01); *B01J 19/26* (2013.01); *C04B 2103/0057* (2013.01); *C08F 2/01* (2013.01); *B01J 8/1827* (2013.01); *C04B 2111/70* (2013.01); *C04B 24/2682* (2013.01); *B01J 2208/00283* (2013.01); *B01J 8/20* (2013.01); *C04B 2111/72* (2013.01); *C04B 2111/00517* (2013.01); *C04B 24/2611* (2013.01); *B01J 8/226* (2013.01); *B01J 2208/0084* (2013.01); *B01J 8/386* (2013.01); *C04B 28/02* (2013.01); *C04B 2111/60* (2013.01); *C04B 24/2641* (2013.01); *B01J 2208/00902* (2013.01); *C04B 24/2623* (2013.01); *C08F 2/18* (2013.01); *C04B 2111/00637* (2013.01); *C08F 2/22* (2013.01); *Y10S 526/918* (2013.01)
USPC ............. 526/64; 526/200; 526/202; 526/918

(58) Field of Classification Search
CPC ...................................... C08F 2/18; C08F 2/22
USPC .................... 526/64, 200, 202, 918
See application file for complete search history.

(56) References Cited

U.S. PATENT DOCUMENTS

| | | | |
|---|---|---|---|
| 2,703,794 A | 3/1955 | Roedel | |
| 3,551,396 A | 12/1970 | Lanthier | |
| 4,022,744 A | 5/1977 | D'Achille et al. | |
| 4,545,945 A | 10/1985 | Präve et al. | |
| 6,660,814 B1 | 12/2003 | Kröner et al. | |
| 6,673,972 B2 * | 1/2004 | Ostrowski et al. ............ 568/620 |
| 2002/0035192 A1 | 3/2002 | Weitzel | |
| 2004/0013595 A1 * | 1/2004 | Kwon et al. .................. 423/406 |
| 2004/0048969 A1 | 3/2004 | Kirsch et al. | |
| 2005/0240063 A1 | 10/2005 | Ostrowski et al. | |

1  Reactor wall
2  Nozzle
3  Plug-in tube
4  Feed line
5  External circuit
6  Metering line
7  Pump
8  Heat exchanger
9  Product outlet
10 Impingement plate

| | | | |
|---|---|---|---|
| 2005/0261423 | A1 | 11/2005 | Funkhauser et al. |
| 2006/0205984 | A1 | 9/2006 | Klass et al. |
| 2008/0114196 | A1 | 5/2008 | Kutschera et al. |
| 2011/0112218 | A1 | 5/2011 | Weitzel et al. |
| 2011/0213073 | A1 | 9/2011 | Weitzel et al. |

FOREIGN PATENT DOCUMENTS

| | | |
|---|---|---|
| DE | 25 55 142 A1 | 6/1976 |
| DE | 10 2007 038 332 A1 | 2/2009 |
| DE | 10 2007 040 850 A1 | 3/2009 |
| EP | 0 054 814 A1 | 6/1982 |
| EP | 0 834 518 A1 | 4/1998 |
| EP | 1 174 445 A1 | 1/2002 |
| EP | 1 923 379 A1 | 5/2008 |
| WO | 02/059158 A2 | 8/2002 |
| WO | 03/006510 A2 | 1/2003 |
| WO | 2004/096741 A2 | 11/2004 |
| WO | 2005/103116 A1 | 11/2005 |

OTHER PUBLICATIONS

P. Zehner, Bubble Columns 4. Jet Loop Reactors, Ullmann's Encyclopedia of Industrial Chemistry, Article Online Posting Date Jun. 15, 2000.

Fox T. G. Bull. Am. Physics Soc. 1,3, p. 123 (1956).

Polymer Handbook 2nd Edition, JU. Wiley & Sons, New York (1975).

Kaumann, Edgar, International Search Report dated Jun. 5, 2012, for International Application No. PCT/EP2012/054162, 4 pages.

Wittmann-Regis, Agnès, International Preliminary Report on Patentability dated Sep. 10, 2013, for International Application No. PCT/EP2012/054162.

\* cited by examiner

*Primary Examiner* — Fred M Teskin

(74) *Attorney, Agent, or Firm* — RatnerPrestia

(57) ABSTRACT

A process for preparing a polymer in the form of an aqueous dispersion or a water-redispersible powder includes free-radically initiated heterophase polymerization of one or more ethylenically unsaturated monomers and optionally subsequent drying of the polymer dispersions obtained, wherein the polymerization is performed in a jet loop reactor.

8 Claims, 1 Drawing Sheet

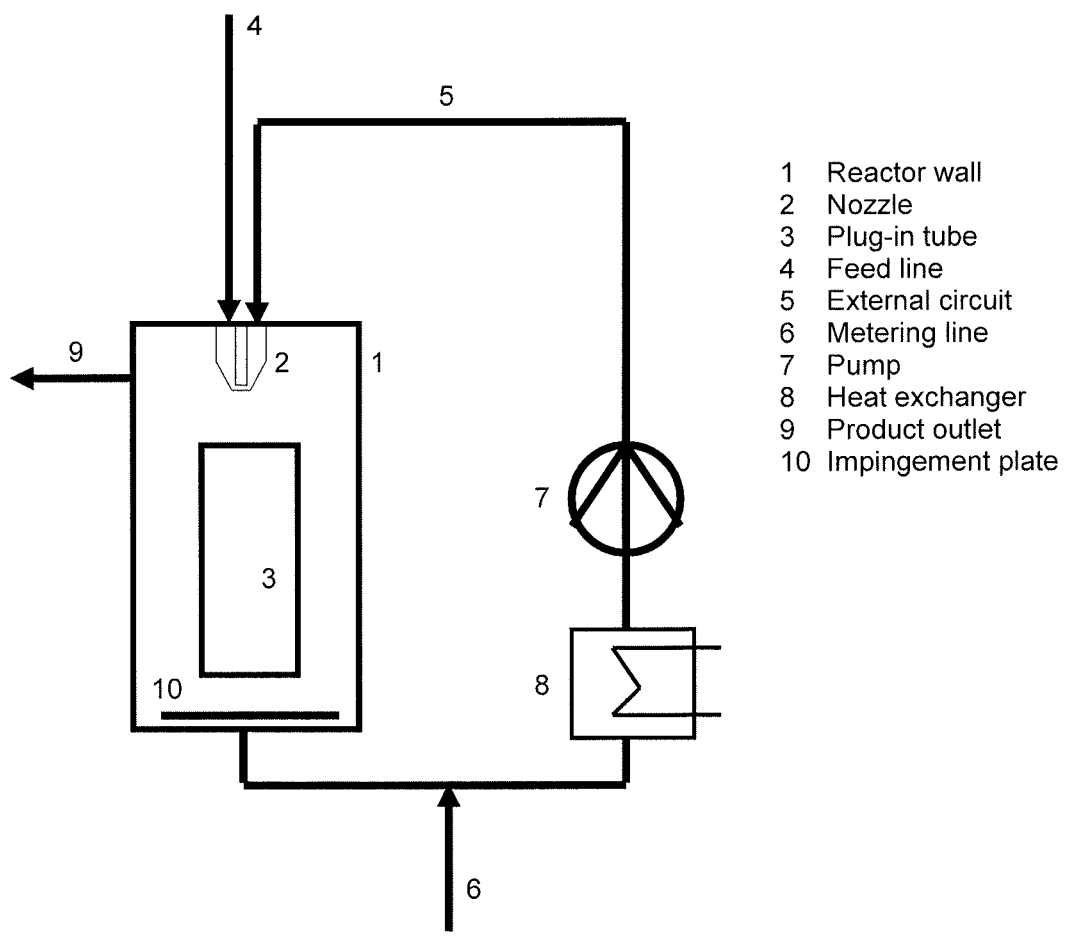
1 Reactor wall
2 Nozzle
3 Plug-in tube
4 Feed line
5 External circuit
6 Metering line
7 Pump
8 Heat exchanger
9 Product outlet
10 Impingement plate

PROCESS FOR PRODUCING POLYMERS BY MEANS OF EMULSION OR SUSPENSION POLYMERIZATION IN A JET LOOP REACTOR

CROSS REFERENCE TO RELATED APPLICATIONS

This application is the national phase filing of international patent application No. PCT/EP2012/054162, filed 9 Mar. 2012, and claims priority of German application number 10 2011 005 388.3, filed 10 Mar. 2011, the entireties of which applications are incorporated herein by reference.

FIELD OF THE INVENTION

The present invention relates to a process for preparing polymers in the form of their aqueous dispersions or water-redispersible powders by means of free-radically initiated emulsion or suspension polymerization of ethylenically unsaturated monomers and also the use of the process products obtained in this way in building chemical products, in particular as coating compositions or adhesives in building chemical products.

BACKGROUND OF THE INVENTION

The emulsion or suspension polymerization of ethylenically unsaturated monomers can be carried out by batch, semibatch or continuous processes. Batch or semibatch processes are usually carried out in stirred reactors and continuous processes are carried out in cascades of stirred vessels, tube reactors or loop reactors. Thus, U.S. Pat. No. 3,551,396 describes processes for preparing polyvinyl acetate dispersions in a loop reactor, in which monomer and water are continuously circulated and additional monomer and initiator are continually metered in and polymer formed is continually taken off from the reactor. U.S. Pat. No. 2,703,794 describes processes for the continuous emulsion polymerization of vinyl acetate and ethylene in the presence of emulsifier and optionally a water-miscible organic solvent. Disadvantages are oscillating processes parameters and consequently formation of polymers having different particle size distributions. DE-A 2555142 describes a continuous process for preparing polymers of ethylenically unsaturated monomers by the emulsion polymerization process in a plurality of polymerization reactors connected in series. EP-A 834518 describes a batch polymerization process in which the polymerization proceeds in a reactor having an external cooling circuit, in which it is absolutely necessary to use a low-shear pump in order not to adversely affect the products. WO-A 03/006510 describes a batch polymerization process in a polymerization reactor having an external cooling circuit, in which the polymerization batch is circulated by pumping by means of a low-shear cylinder pump or peristaltic pump in order for the products not to be adversely affected by shearing. WO-A 02/59158 describes a polymerization process in a reactor having an external cooling circuit, in which the polymerization batch is circulated by pumping and at least a partial amount of the monomer has to be introduced into the external circuit. A disadvantage of the batch polymerization processes in which large-volume batches containing dispersed polymer particles have to be circulated by pumping is their susceptibility to coagulation as a result of the shear forces introduced by the pump.

However, to prepare polymers having different average particle sizes or different particle size distributions, it is generally necessary to vary the formulations of the polymerization components or make substantial changes in the polymerization conditions or polymerization process.

Furthermore, it is a problem, especially in the case of continuous emulsion or suspension polymerization processes, to set constant polymerization conditions over the entire duration of the polymerization and thus prevent oscillation of the process parameters so that polymers having the same properties are formed over the entire duration of the polymerization.

SUMMARY OF THE INVENTION

In the light of this background, it was an object of the invention to provide novel processes for the emulsion or suspension polymerization of ethylenically unsaturated monomers, by means of which the product properties of polymers, for example average particle sizes or breadth of the particle size distribution, can be varied in a targeted manner by means of technically simple measures. In particular, weight average particle size distributions of ≤1 µm should be obtained, even in the case of formulations which in conventional processes give weight average particle size distributions of >1 µm (determination by means of laser light scattering in accordance with ISO 13320). Furthermore, oscillation of the process parameters should be suppressed.

This object has surprisingly been achieved by carrying out the emulsion or suspension polymerization of ethylenically unsaturated monomers in jet loop reactors.

Emulsion polymerization and suspension polymerization are also referred to collectively as heterophase polymerization in the following.

BRIEF DESCRIPTION OF THE DRAWING

The FIGURE is a schematic representation of a jet loop reactor suitable for polymer production according to the invention.

DETAILED DESCRIPTION OF THE INVENTION

The invention provides a process for preparing polymers in the form of their aqueous dispersions or water-redispersible powders by free-radically initiated heterophase polymerization of one or more ethylenically unsaturated monomers and optionally subsequent drying of the resulting polymer dispersions, characterized in that the heterophase polymerization is carried out in a jet loop reactor.

Examples of jet loop reactors are compact, impingement jet or jet zone loop reactors. Jet loop reactors per se and their structure are known and described, for example, in P. Zehner, Bubble Columns 4. Jet Loop Reactors, Ullmann's Encyclopedia of Industrial Chemistry, Article Online Posting Date 15 Jun. 2000.

A preferred embodiment of the process of the invention is shown by way of example in the FIGURE.

The jet loop reactor (FIGURE) generally contains one or more nozzles (2), one or more plug-in tubes (3), optionally one or more feed lines (4), optionally one or more product outlets (9), optionally one or more impingement plates (10), optionally one or more external circuits (5) and optionally further structures, for example coolers, in particular jacket coolers. An external circuit (5) comprises, for example, one or more pumps (7), one or more metering lines (6) and optionally one or more heat exchangers (8).

The nozzle (2) is generally located entirely or partly within the jet loop reactor. Nozzle (2), plug-in tube (3) and optionally the impingement plate (10) are generally arranged linearly, preferably in a vertical alignment, relative to one another. Owing to this arrangement, the polymerization medium is, after introduction via the nozzle (2), conveyed through the plug-in tube (3) and deflected in the region of the reactor bottom or the impingement plate (10) and the polymerization medium flows further through the region between plug-in tube (3) and reactor wall (1), so that finally a flow is induced within the jet loop reactor around the plug-in tube (3). As a result, liquid and gaseous, dissolved, emulsified or dispersed constituents of the polymerization medium are circulated in the reactor and as a result intensively mixed so that very homogeneous mixing of the polymerization medium is brought about.

If the jet loop reactor has a plurality of nozzles (2), these are preferably arranged next to one another, in particular parallel or horizontally. If a plurality of plug-in tubes (3) are present, these are also preferably arranged next to one another, in particular parallel or horizontally.

One or more external circuits (5) are connected to the jet loop reactor when part of the polymerization medium is to be taken off from the jet loop reactor and recirculated to the jet loop reactor. The polymerization medium can be taken off at any point in the jet loop reactor. The polymerization medium is preferably taken off at the bottom of the jet loop reactor, in particular below the impingement plate (10). From the external circuit, the polymerization medium is preferably recirculated into the jet loop reactor through the nozzle (2). In this way, homogeneous mixing of the polymerization medium can be achieved. Further starting materials, for example one or more ethylenically unsaturated monomers and/or one or more initiators, can be introduced via metering line (6). The temperature of the polymerization medium present in the external circuit (5) can be controlled by means of heat exchangers (8). The transport of the polymerization medium through the external circuit (5) can be effected by means of one or more pumps (7).

The operation of an external circuit will hereinafter also be referred to as recirculation.

A substantial advantage of the process of the invention is that the properties of the polymers, e.g. average particle sizes or particle size distribution, can be influenced by technically simple variations of the operating parameters of the jet loop reactors. The driving jet velocity, i.e. the velocity at which the polymerization medium passes through the nozzle (2), is preferably from 3 to 25 m/s and particularly preferably from 5 to 15 m/s. The ratio of the reactor height to reactor diameter is preferably from 1 to 15 and particularly preferably from 2 to 7. The ratio of reactor diameter to nozzle diameter (2) is preferably from 10 to 1000 and particularly preferably from 20 to 100.

The jet loop reactor can be operated by batch, semibatch or continuous processes, optionally with recirculation. In particular, the continuous process can also be operated without recirculation.

In continuous operation without recirculation, starting materials, in particular ethylenically unsaturated monomers and initiator, are introduced via the feed line (4) during the heterophase polymerization and polymerization medium is discharged via the product outlet (9) and the polymers can then be isolated from this discharged polymerization medium. In continuous operation, the inflowing mass flows should correspond to the outflowing mass flows. In continuous operation without recirculation, preference is thus given to no external circuit (5) being installed.

In continuous operation with recirculation, starting materials, in particular ethylenically unsaturated monomers and initiator, are introduced via the feed line (4) or via metering line (6) during the heterophase polymerization and polymerization medium is discharged via the product outlet (9) and the polymers can then be isolated from this discharged polymerization medium. In continuous operation, the inflowing mass flows should correspond to the outflowing mass flows.

In semibatch processes or in batch processes, one or more external circuits (5) are generally installed on the jet loop reactor. In the case of semibatch processes, starting materials, in particular ethylenically unsaturated monomers and initiator, are introduced via the feed line (4) and/or optionally metering line (6), but no polymerization medium is discharged via the product outlet (9). In the case of batch processes, no starting material, e.g. ethylenically unsaturated monomers, are introduced via the feed line (4) during the heterophase polymerization and no polymerization medium is discharged via the product outlet (9).

Preference is given to the semibatch process and in particular the continuous process with recirculation.

The charging of the jet loop reactor with starting materials or the introduction of starting materials into the jet loop reactor is generally effected via the nozzle (2). As nozzles (2), preference is given to multifluid nozzles, in particular two-fluid nozzles. Two-fluid nozzles have two inlets via which in one case a starting material and in the other case the medium of an external circuit (5) are preferably conveyed and an outlet through which the polymerization medium is introduced into the jet loop reactor.

Polymerization medium and the polymerization product present therein can be taken off from product outlet (9).

Temperature regulation, i.e. heating or cooling, can be effected by means of one or more heat exchangers which can be installed in the external circuit (5) or be attached directly on the jet loop reactor. For this purpose, it is possible to use conventional heat exchangers, for example jacket coolers, jacket heaters, shell-and-tube heat exchangers or plate heat exchangers.

In a preferred embodiment, the jet loop reactor is built into a cascade comprising further reactors. A cascade thus contains at least two reactors connected in series. The polymerization medium can be taken off from the first reactor at any point and fed into the second reactor at any point. In the case of jet loop reactors, the polymerization medium is preferably taken off from the product outlet (9) of the first reactor and conveyed into the second reactor. When the second reactor is a jet loop reactor, the polymerization medium is preferably introduced into the jet loop reactor via a metering line (6) of an external circuit (5) or optionally via the feed line (4).

Preferred cascades contain two or more jet loop reactors; or one or more jet loop reactors and one or more jet zone loop reactors; or one or more jet loop reactors and one or more airlift loop reactors; or one or more jet loop reactors and one or more stirred vessels. In the cascades, each of the reactors can be installed in one or more external circuits (5).

Before commencement of the polymerization, the jet loop reactor is preferably filled to from 50 to 80% of its volume with a polymer dispersion which preferably corresponds to the end product of the polymerization in terms of polymer composition, type and amount of protective colloid and particle size and solids content. This can be carried out by producing such dispersions in the jet loop reactors by means of batch polymerization, or charging the jet loop reactors with a separately produced dispersion.

The individual starting materials of the polymerization batch, e.g. ethylenically unsaturated monomers, initiators, protective colloids or seed particles, are usually introduced via feed line (4) or the metering line (6). The starting materials can be introduced individually or in premixed form, as pure substance or in the form of a solution, suspension or emulsion. The starting materials are preferably premixed in an upstream mixing unit.

All monomers and the protective colloid can be introduced via the feed line (4) or in the external circuit (5) via one or more metering lines (6) arranged physically upstream or downstream of a heat exchanger (8).

The polymerization is initiated by means of a conventional initiator, in particular a redox system composed of oxidizing components and reducing components. The reducing component is preferably introduced in its entirely via the feed line (4). The monomer conversion is generally controlled via the amount of initiator introduced.

The residence time of the polymerization medium in the jet loop reactor can be selected freely in continuous operation by setting of the metered additions.

The polymerization can be carried out under ambient pressure or at an increased pressure relative to the surroundings, in particular at from 10 to 80 bar.

After the polymerization has been concluded, an after-polymerization can be carried out using known methods, generally by means of an after-polymerization initiated using a redox catalyst, in order to remove residual monomers.

For this purpose, after conclusion of the polymerization, preference is given to using a reactor operated under superatmospheric pressure and/or a loop reactor operated under ambient pressure, in particular a jet loop reactor or jet zone loop reactor or a cascade of a jet loop reactor and an airlift loop reactor for the after-polymerization.

Volatile constituents such as residual monomers can also be removed by distillation, preferably under reduced pressure, and optionally with passage of inert entrainer gases such as air, nitrogen or steam through or over the reaction mixture.

The ethylenically unsaturated monomers are preferably selected from the group consisting of vinyl esters, (meth)acrylic esters, vinylaromatics, olefins, 1,3-dienes and vinyl halides and optionally further monomers which are copolymerizable therewith.

Suitable vinyl esters are, for example, those of carboxylic acids having from 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of a-branched monocarboxylic acids having from 9 to 11 carbon atoms, for example VeoVa9® or VeoVa10® (trade names of Resolution). Particular preference is given to vinyl acetate.

Suitable monomers from the group of acrylic esters and methacrylic esters are, for example, esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinylaromatics are styrene, methylstyrene and vinyltoluene. A preferred vinyl halide is vinyl chloride. The preferred olefins are ethylene, propylene and the preferred dienes are 1,3-butadiene and isoprene. From 0 to 10% by weight, based on the total weight of the monomer mixture, of auxiliary monomers can optionally be additionally copolymerized. Preference is given to using from 0.1 to 5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride; ethylenically unsaturated sulfonic acids or salts thereof, preferably vinylsulfonic acid, 2-acrylamido-2-methylpropanesulfonic acid. Further examples are pre-crosslinking comonomers such as multiply ethylenically unsaturated comonomers, for example diallyl phthalate, divinyl adipate, diallyl maleate, allyl methacrylate or triallyl cyanurate, or post-crosslinking comonomers, for example acrylamidoglycolic acid (AGA), methyl methylacrylamidoglycolate (MMAG), N-methylolacrylamide (NMA), N-methylolmethacrylamide, allyl N-methylol-carbamate, alkyl ethers such as the isobutoxy ether or ester of N-methylolacrylamide, of N-methylolmethacrylamide and of allyl N-methylol-carbamate. Epoxide-functional comonomers such as glycidyl methacrylate and glycidyl acrylate are also suitable. Further examples are silicon-functional comonomers such as acryloxypropyltri(alkoxy)silanes and methacryloxypropyltri(alkoxy)silanes, vinyltrialkoxysilanes and vinylmethyldialkoxysilanes, where ethoxy and ethoxypropylene glycol ether radicals, for example, can be present as alkoxy groups. Mention may also be made of monomers having hydroxy or CO groups, for example hydroxyalkyl methacrylates and acrylates, e.g. hydroxyethyl, hydroxypropyl or hydroxybutyl acrylate or methacrylate, and also compounds such as diacetoneacrylamide and acetylacetoxyethyl acrylate or methacrylate.

Preference is given to selecting one or more monomers from the group consisting of vinyl esters, vinyl ester mixtures containing one or more monomers from the group consisting of vinyl esters, olefins, vinylaromatics, vinyl halides, acrylic esters, methacrylic esters, fumaric and/or maleic monoesters or diesters; (meth)acrylic ester homopolymers, (meth)acrylic ester mixtures containing one or more monomers from the group consisting of methacrylic esters, acrylic esters, olefins, vinylaromatics, vinyl halides, fumaric and/or maleic monoesters or diesters; monomers or monomer mixtures of dienes such as butadiene or isoprene and also of olefins such as ethene or propene, where the dienes can, for example, be copolymerized with styrene, (meth)acrylic esters or the esters of fumaric or maleic acid; monomers or monomer mixtures of vinylaromatics such as styrene, methylstyrene, vinyltoluene; monomers or monomer mixtures of vinyl halogen compounds such as vinyl chloride, where the monomer mixtures can additionally comprise auxiliary monomers.

Particular preference is given to monomer mixtures of one or more vinyl esters with from 1 to 50% by weight of ethylene; monomer mixtures of vinyl acetate with from 1 to 50% by weight of ethylene and from 1 to 50% by weight of one or more further comonomers from the group of vinyl esters having from 1 to 12 carbon atoms in the carboxylic acid radical, e.g. vinyl propionate, vinyl laurate, vinyl esters of alpha-branched carboxylic acids having from 9 to 13 carbon atoms, e.g. VeoVa9, VeoVa10, VeoVa11; monomer mixtures of one or more vinyl esters, from 1 to 50% by weight of ethylene and preferably from 1 to 60% by weight of (meth)acrylic esters of unbranched or branched alcohols having from 1 to 15 carbon atoms, in particular n-butyl acrylate or 2-ethylhexyl acrylate; and monomer mixtures comprising from 30 to 75% by weight of vinyl acetate, from 1 to 30% by weight of vinyl laurate or vinyl esters of an alpha-branched carboxylic acid having from 9 to 11 carbon atoms and from 1 to 30% by weight of (meth)acrylic esters of unbranched or branched alcohols having from 1 to 15 carbon atoms, in particular n-butyl acrylate or 2-ethylhexyl acrylate, which additionally contain from 1 to 40% by weight of ethylene; monomer mixtures comprising one or more vinyl esters, from 1 to 50% by weight of ethylene and from 1 to 60% by weight of vinyl chloride; where the monomer mixtures can additionally contain the auxiliary monomers mentioned in the amounts indicated and the figures in % by weight in each case add up to 100% by weight.

Particular preference is also given to (meth)acrylic ester monomer mixtures such as monomer mixtures of n-butyl acrylate or 2-ethylhexyl acrylate or copolymers of methyl methacrylate with n-butyl acrylate and/or 2-ethylhexyl acrylate; styrene-acrylic ester monomer mixtures comprising one or more monomers from the group consisting of methyl acrylate, ethyl acrylate, propyl acrylate, n-butyl acrylate, 2-ethylhexyl acrylate; vinyl acetate-acrylic ester monomer mixtures comprising one or more monomers from the group consisting of methyl acrylate, ethyl acrylate, propyl acrylate, n-butyl acrylate, 2-ethylhexyl acrylate and optionally ethylene; styrene-1,3-butadiene monomer mixtures, where the monomer mixtures can additionally contain auxiliary monomers in the amounts indicated and the figures in % by weight in each case add up to 100% by weight.

Examples of particularly preferred comonomers for vinyl chloride monomer mixtures are α-olefins such as ethylene or propylene and/or vinyl esters such as vinyl acetate and/or acrylic esters or methacrylic esters of alcohols having from 1 to 15 carbon atoms, e.g. methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate, and/or fumaric and/or maleic monoesters or diesters such as dimethyl, methyl t-butyl, di-n-butyl, di-t-butyl and diethyl esters of maleic acid or fumaric acid.

Monomer mixtures which are most preferred are monomer mixtures comprising vinyl acetate and from 5 to 50% by weight of ethylene; or monomer mixtures comprising vinyl acetate, from 1 to 50% by weight of ethylene and from 1 to 50% by weight of a vinyl ester of α-branched monocarboxylic acids having from 9 to 11 carbon atoms; or monomer mixtures comprising from 30 to 75% by weight of vinyl acetate, from 1 to 30% by weight of vinyl laurate or vinyl esters of an alpha-branched carboxylic acid having from 9 to 11 carbon atoms and from 1 to 30% by weight of (meth) acrylic esters of unbranched or branched alcohols having from 1 to 15 carbon atoms and additionally from 1 to 40% by weight of ethylene; or monomer mixtures comprising vinyl acetate, from 5 to 50% by weight of ethylene and from 1 to 60% by weight of vinyl chloride.

Most preferred monomer mixtures are also vinyl chloride-ethylene monomer mixtures containing from 60 to 98% by weight of vinyl chloride units and from 1 to 40% by weight of ethylene units, where the figures in % by weight are based on the total weight of the monomer mixtures and in each case add up to 100% by weight. The selection of monomers and the selection of the proportions by weight of the comonomers is carried out so that, in general, a glass transition temperature Tg of from −50° C. to +50° C., preferably from −20° C. to +30° C., results. The glass transition temperature Tg of the polymers can be determined in a known way by means of Differential Scanning calorimetry (DSC). The Tg can also be calculated approximately beforehand by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in kelvin of the homopolymer of the monomer n. Tg values for homopolymers may be found in Polymer Handbook 2nd Edition, JU. Wiley & Sons, New York (1975).

The polymerization is carried out by the suspension polymerization process or preferably by the emulsion polymerization process. The polymerization temperature is generally from 40° C. to 100° C., preferably from 60° C. to 90° C. Initiation of the polymerization is effected by means of the initiators customary for the emulsion or suspension polymerization, in particular redox initiator combinations. Examples of suitable oxidation initiators are the sodium, potassium and ammonium salts of peroxodisulfuric acid, hydrogen peroxide, t-butyl peroxide, t-butyl hydroperoxide, cumene hydroperoxide, isopropylbenzene monohydroperoxide and azobisisobutyronitrile. Preference is given to the sodium, potassium and ammonium salts of peroxodisulfuric acid and hydrogen peroxide. The initiators mentioned are generally used in an amount of from 0.01 to 2.0% by weight, based on the total weight of the monomers.

Suitable reducing agents are the sulfites and bisulfites of the alkali metals and of ammonium, for example sodium sulfite, the derivatives of sulfoxylic acid, e.g. zinc or alkali metal formaldehydesulfoxylates, for example sodium hydroxymethanesulfinate (Brüggolit) and (iso)ascorbic acid. Preference is given to sodium hydroxymethanesulfinate and (iso)ascorbic acid. The amount of reducing agent is preferably from 0.015 to 3% by weight, based on the total weight of the monomers.

To control the molecular weight, it is possible to use chain-transferring substances during the polymerization. If chain transfer agents are used, these are usually used in amounts in the range from 0.01 to 5.0% by weight, based on the monomers to be polymerized, and are introduced separately or premixed with reaction components. Examples of such substances are n-dodecyl mercaptan, tert-dodecyl mercaptan, mercaptopropionic acid, ethyl mercaptopropionate, isopropanol and acetaldehyde. Preference is given to not using any chain-transferring substances.

The polymerization is preferably carried out in the presence of protective colloids. Suitable protective colloids are partially hydrolyzed polyvinyl alcohols; polyvinylpyrrolidones; polyvinyl acetals; polysaccharides in water-soluble form, e.g. starches (amylose and amylopectin), celluloses and carboxymethyl, methyl, hydroxyethyl, hydroxypropyl derivatives thereof; proteins such as casein or caseinate, soy protein, gelatin, lignosulfonates; synthetic polymers such as poly(meth)acrylic acids, copolymers of (meth)acrylates with carboxyl-functional comonomer units; poly(meth)acrylamide, polyvinylsulfonic acids and water-soluble copolymers thereof; melanine-formaldehyde sulfonates, naphthalene-formaldehyde sulfonates, styrene-maleic acid and vinyl ether-maleic acid copolymers; cationic polymers such as poly-DADMAC.

Preferred protective colloids are partially hydrolyzed or fully hydrolyzed polyvinyl alcohols. Particular preference is given to partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015). Particular preference is also given to partially hydrolyzed, hydrophobically modified polyvinyl alcohols having a degree of hydrolysis of from 80 to 95 mol % and a Höppler viscosity in 4% strength aqueous solution of from 1 to 30 mPas. Examples are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or from 9 to 11 carbon atoms, dialkyl maleates and dialkyl fumarates, e.g.

diisopropyl maleate and diisopropyl fumarate, vinyl chloride, vinyl alkyl ethers such as vinyl butyl ether, olefins such as ethene and decene. The proportion of the hydrophobic units is preferably from 0.1 to 10% by weight, based on the total weight of the partially hydrolyzed polyvinyl alcohol. It is also possible to use mixtures of the polyvinyl alcohols mentioned.

Further particularly preferred polyvinyl alcohols are partially hydrolyzed, hydrophobicized polyvinyl alcohols which are obtained by polymer-analogous reaction, for example acetalization of the vinyl alcohol units by means of C1-C4-aldehydes such as butyraldehyde. The proportion of the hydrophobic units is preferably from 0.1 to 10% by weight, based on the total weight of the partially hydrolyzed polyvinyl acetate. The degree of hydrolysis is from 80 to 95 mol %, preferably from 85 to 94 mol %, and the Höppler viscosity (DIN 53015, Höppler method, at 20° C., 4% strength aqueous solution) is from 1 to 30 mPas, preferably from 2 to 25 mPas.

Greatest preference is given to polyvinyl alcohols having a degree of hydrolysis of from 85 to 94 mol % and a Höppler viscosity in 4% strength aqueous solution of from 3 to 15 mPas (Höppler method at 20° C., DIN 53015). The protective colloids mentioned can be obtained by processes known to those skilled in the art.

The polyvinyl alcohols are generally added in a total amount of from 1 to 20% by weight, based on the total weight of the monomers, in the polymerization.

In the process of the invention, the polymerization is preferably carried out without addition of emulsifiers. In exceptional cases, it can be advantageous to use emulsifiers, optionally from 1 to 10% by weight, based on the amount of monomers. Suitable emulsifiers are anionic, cationic and nonionic emulsifiers, for example anionic surfactants such as alkylsulfates having a chain length of from 8 to 18 carbon atoms, alkyl or alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monovalent alcohols or alkylphenols or nonionic surfactants such as alkyl polyglycol ethers or alkylaryl polyglycol ethers having from 8 to 40 ethylene oxide units.

The aqueous dispersions which can be obtained by the process of the invention have a solids content of from 30 to 75% by weight, preferably from 50 to 60% by weight.

To prepare the water-redispersible polymer powders, the aqueous dispersions are, optionally after addition of protective colloids as drying aid, dried, for example by means of fluidized-bed drying, freeze drying or spray drying. The dispersions are preferably spray dried. Spray drying is carried out in conventional spray-drying plants, with atomization being able to be effected by means of one-fluid, two-fluid or multifluid nozzles or by means of a rotating disk. The output temperature is generally selected in the range from 45° C. to 120° C., preferably from 60° C. to 90° C., depending on the plant, the Tg of the resin and the desired degree of drying.

In general, the drying aid is used in a total amount of from 3 to 30% by weight, based on the polymeric constituents of the dispersion, i.e. the total amount of protective colloid before the drying operation should be from ≥3 to 30% by weight, based on the amount of polymer; preference is given to using from 5 to 20% by weight, based on the amount of polymer.

Suitable drying aids are partially hydrolyzed polyvinyl alcohols; polyvinylpyrrolidones; polyvinyl acetals; polysaccharides in water-soluble form, e.g. starches (amylose and amylopectin), celluloses and carboxymethyl, methyl, hydroxyethyl, hydroxypropyl derivatives thereof; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine-formaldehyde sulfonates, naphthalene-formaldehyde sulfonates, styrene-maleic acid and vinyl ether-maleic acid copolymers; cationic polymers such as poly-DADMAC. Preference is given to no further protective colloids in addition to polyvinyl alcohols being used as drying aid.

In atomization, a content of up to 1.5% by weight of antifoam, based on the base polymer, has frequently been found to be advantageous. To increase the storage life by improving the blocking stability, in particular in the case of powders having a low glass transition temperature, the powder obtained can be provided with an antiblocking agent (anticaking agent), preferably in an amount of up to 30% by weight, based on the total weight of polymeric constituents. Examples of antiblocking agents are Ca carbonate and Mg carbonate, talc, gypsum, silica, kaolins, metakaolin, silicates having particle sizes which are preferably in the range from 10 nm to 10 μm.

The viscosity of the feed to be atomized is set via the solids content so that a value of <500 mPas (Brookfield viscosity at 20 revolutions and 23° C.), preferably <250 mPas, is obtained. The solids content of the dispersion to be atomized is generally >35%, preferably >45%.

To improve the use properties, further additives can be added during atomization. Further constituents of dispersion powder compositions which are present in preferred embodiments are, for example, pigments, fillers, foam stabilizers, hydrophobicizing agents.

The aqueous polymer dispersions and the water-redispersible, protective colloid-stabilized polymer powders can be used in the fields of application typical for such powders, for example in building chemical products, optionally in combination with hydraulically setting binders such as cements (portland, aluminate, trass, slag, magnesia, phosphate cement), gypsum plaster and water glass, for the production of building adhesives, in particular tile adhesives and full thermal insulation adhesives, plasters and renders, knifing fillers, floor screeds, self-leveling compositions, sealing slurries, joint mortars and paints. They can also be used as binders for coating compositions and adhesive or as coating compositions or binders for textiles and paper.

A substantial advantage of the use of the jet loop reactors for the heteropolymerization is the intensive and rapid mixing of the reaction medium and high heat and mass transfer.

The process of the invention enables the average particle sizes of the polymers to be controlled in a targeted manner by variation of the process conditions such as reactor geometry or operating parameters, for example driving jet velocity or recirculation rates, i.e. technically simple measures make it possible to obtain polymers having different average particle sizes. The particle size distributions of the polymers can also be influenced by the process conditions used. In conventional processes, on the other hand, variations of the formulations of the polymerization batches are usually necessary for controlling the average particle size of the polymers.

It was particularly surprising that the high shear forces occurring on exit of the polymerization medium from the nozzle did not lead to any coagulation of the polymerization medium, as is disadvantageously the case when such high shear forces occur in conventional loop reactors or stirred tank reactors. Coagulation leads to reactor fouling or even to blockage of tube reactors. Coagulums have to be laboriously removed from the product by means of filtration.

The following examples serve to illustrate the invention in detail and do not constitute any restriction.

EXAMPLE 1 (EX. 1)

Polymerization by Semibatch Processes

The jet loop reactor having a volume of 450 ml depicted in the FIGURE was used. The jet loop reactor had a ratio of reactor height to reactor diameter H/D of 2 and a ratio of reactor diameter to nozzle diameter d/D of 74. The jet loop reactor was operated in the semibatch mode and at a driving jet velocity of 5 m/s.

120 g of a 10% strength aqueous solution of a polyvinyl alcohol having a degree of hydrolysis of 88 mol % and a Happier viscosity at 20° C. of 4 mPas and also 120 g of vinyl acetate and 30 g of VeoVa10 were placed in the jet loop reactor via the feed line (4). The polymerization medium was heated at atmospheric pressure to 65° C. by means of the heat exchanger (8) and fed through a nozzle of the two-fluid nozzle (2) by means of the pump (7). The jet loop reactor was at this point in time filled to 60% of its volume.

The following materials were subsequently introduced via the feed line (4) and the second part of the two-fluid nozzle (2) over a period of 4 hours: 96 g of the abovementioned polyvinyl alcohol solution, 20 g of 0.1% strength tert-butyl hydroperoxide; 20 g of a 0.17% strength ascorbic acid solution, 10 g of VeoVa10 and 110 g of vinyl acetate.

The polymer dispersion obtained in this way had a solids content of 55%. The residual monomer content was 1.2%, based on the polymer dispersion. Further results are shown in table 1.

COMPARATIVE EXAMPLE 2 (COMP. EX. 2)

Polymerization in a Stirred Tank Reactor

A polymerization using a formulation, i.e. initial charge and further introduction, analogous to example 1 was carried out at a temperature and a pressure and a polymerization time as described in example 1 in a stirred laboratory vessel having a volume of 500 ml. The residual monomer content of the dispersion obtained in this way was 1.8%, based on dispersion. Further results are shown in the table.

TABLE 1

| | Solids content | Average particle diameter Dw*) | Dn*) | Dw/Dn |
|---|---|---|---|---|
| Ex. 1 | 55% | 0.677 µm | 0.355 µm | 1.91 |
| Comp. Ex. 2 | 55% | 1.330 µm | 0.433 µm | 3.07 |

*)determined using the measuring instrument Beckmann Coulter ® LS in accordance with ISO 13320.

It can be seen from table 1 that the process of the invention (Ex. 1) leads to polymers having a smaller average particle diameter Dw compared to conventional processes (comp. ex. 2). In addition, the particle size distribution is narrower, as can be seen from the smaller Dw/Dn ratio.

EXAMPLE 3

Variation of the Driving Jet Velocity

Analogous to example 1 except that the driving jet velocity was 10 m/s.

The average particle diameter Dw of the polymers can be influenced significantly by varying the driving jet velocity at the nozzle (2) of the jet loop reactor. The results are shown in table 2.

TABLE 2

| | Driving jet velocity | Average particle diameter Dw |
|---|---|---|
| Example 1 | 5 m/s | 0.677 µm |
| Example 3 | 10 m/s | 0.358 µm |

*)determined using the measuring instrument Beckmann Coulter ® LS in accordance with ISO 13320.

EXAMPLE 4

Continuous Polymerization

In a manner analogous to example 1, a polymer dispersion was firstly prepared by a semibatch process in the jet loop reactor. After a polymerization time of 4 hours, the solids content was 55%. The components indicated below were subsequently introduced at the indicated rates of introduction via the metering line (6) and the jet loop reactor was changed to a continuous mode of operation:

10% strength aqueous polyvinyl alcohol solution having a degree of hydrolysis of 88 mol % and a Höppler viscosity at 20° C. of 4 mPas: 70 ml/h,
  vinyl acetate: 84 ml/h,
  VeoVa10: 14.9 ml/h,
  tert-butyl hydroperoxide (0.1% strength): 6.6 ml/h,
  ascorbic acid (0.17% strength): 6.6 ml/h.

The jet loop reactor was operated continuously for 8 hours. During this time, polymerization medium, i.e. a polymer dispersion, having a solids content of 55% and an average particle diameter Dw of 0.730 µm (determined by the measuring instrument Beckmann Coulter® LS in accordance with ISO 13320) was taken off at the product outlet (9).

COMPARATIVE EXAMPLE 5

A polymerization was carried out in a manner analogous to example 4 in a cascade of stirred vessels consisting of two stirred vessels having a volume of 500 ml each.

The stirred vessels were charged with the dispersion from example 4 and the following feed streams were started:
Stirred Vessel 1:
10% strength aqueous polyvinyl alcohol solution having a degree of hydrolysis of 88 mol % and a Höppler viscosity at 20° C. of 4 mPas: 70 ml/h,
  vinyl acetate: 84 ml/h,
  VeoVa10: 14.9 ml/h,
  tert-butyl hydroperoxide (0.1% strength): 6.6 ml/h,
  ascorbic acid (0.17% strength): 6.6 ml/h.
Stirred Vessel 2:
tert-butyl hydroperoxide (0.1% strength): 12.2 ml/h, ascorbic acid (0.17% strength): 12.2 ml/h.

The cascade of stirred vessels was operated continuously for 8 hours.

The polymers obtained had an average particle diameter Dw of 2.2 μm (determined by the measuring instrument Beckmann Coulter® LS in accordance with ISO 13320).

The invention claimed is:

1. A process for preparing a polymer in the form of its aqueous dispersion or water-redispersible powder, comprising free-radically initiated heterophase polymerization of one or more ethylenically unsaturated monomers and optionally subsequent drying of the resulting aqueous polymer dispersion to form the water-redispersible powder, wherein the heterophase polymerization is carried out in a jet loop reactor.

2. The process as claimed in claim 1, wherein the jet loop reactor contains one or more nozzles, one or more plug-in tubes, optionally one or more feed lines, optionally one or more product outlets, optionally one or more impingement plates, optionally one or more external circuits and optionally further structures.

3. The process as claimed in claim 1, wherein the process employs a driving jet velocity of from 3 to 25 m/s.

4. The process as claimed in claim 1, wherein the jet loop reactor is operated by a batch, semibatch or continuous process, optionally with recirculation.

5. The process as claimed in claim 1, wherein the jet loop reactor is built into a cascade of reactors comprising
two or more jet loop reactors; or
one or more jet loop reactors and one or more jet zone loop reactors; or
one or more jet loop reactors and one or more airlift loop reactors; or
one or more jet loop reactors and one or more stirred vessels.

6. The process as claimed in claim 1, wherein the heterophase polymerization is carried out by emulsion or suspension polymerization.

7. The process as claimed in claim 1, wherein the one or more ethylenically unsaturated monomers are selected from the group consisting of vinyl esters, (meth)acrylic esters, vinylaromatics, olefins, 1,3-dienes and vinyl halides, and optionally further monomers which are copolymerizable therewith.

8. The process as claimed in claim 1, wherein the heterophase polymerization is carried out in the presence of one or more protective colloids selected from the group consisting of polyvinyl alcohols; polyvinylpyrrolidones; polyvinyl acetals; polysaccharides in water-soluble form; celluloses and carboxymethyl, methyl, hydroxyethyl or hydroxypropyl derivatives thereof; proteins; poly(meth)acrylic acid; copolymers of (meth)acrylates with carboxyl-functional comonomer units; poly(meth)acrylamide; polyvinylsulfonic acids and water-soluble copolymers thereof; melamine-formaldehyde sulfonates; naphthalene-formaldehyde sulfonates; styrene-maleic acid copolymers; vinyl ether-maleic acid copolymers; and cationic polymers.

* * * * *